US010125021B2

(12) United States Patent
Schmitt et al.

(10) Patent No.: US 10,125,021 B2
(45) Date of Patent: Nov. 13, 2018

(54) PROCESS FOR PREPARING CELLULAR INORGANIC MONOLITHIC MATERIALS AND USES OF THESE MATERIALS

(75) Inventors: Veronique Schmitt, Talence (FR); Renal Backov, Bordeaux-Cauderan (FR); Mathieu Destribat, Bordeaux (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 13/816,771

(22) PCT Filed: Oct. 10, 2011

(86) PCT No.: PCT/FR2011/052359
§ 371 (c)(1),
(2), (4) Date: May 20, 2013

(87) PCT Pub. No.: WO2012/049412
PCT Pub. Date: Apr. 19, 2012

(65) Prior Publication Data
US 2013/0277311 A1    Oct. 24, 2013

(30) Foreign Application Priority Data
Oct. 11, 2010 (FR) .................................. 10 58247

(51) Int. Cl.
*G01N 30/02* (2006.01)
*C01B 33/12* (2006.01)
(Continued)

(52) U.S. Cl.
CPC ........ *C01B 33/124* (2013.01); *B01D 39/2068* (2013.01); *C04B 35/14* (2013.01);
(Continued)

(58) Field of Classification Search
None
See application file for complete search history.

(56) References Cited

FOREIGN PATENT DOCUMENTS

FR    2852947 A1 * 10/2004
FR    2912400       8/2008

OTHER PUBLICATIONS

Dodecane. Wikipedia. Accessed Nov. 13, 2014 on <http://en.wikipedia.org/wiki/Dodecane>.*
(Continued)

*Primary Examiner* — Kara Graber
(74) *Attorney, Agent, or Firm* — Ipsilon USA, LLP

(57) ABSTRACT

A process is provided for preparing an inorganic material in the form of an alveolar monolith of a silica matrix where the monolith includes interconnected macropores. The process includes at least one step of mineralizing an oil-in-water emulsion formed from droplets of an oily phase dispersed in a continuous aqueous phase and in which colloidal solid particles are present at the interface formed between the continuous aqueous phase and the dispersed droplets of oily phase. Such materials obtained according to this process may be used, especially for separative chemistry and filtration, for performing chemical reactions catalyzed in heterogeneous phase, as thermal or phonic insulators, or as templates for manufacturing controlled-porosity carbon skeletons.

18 Claims, 11 Drawing Sheets

(51) Int. Cl.
*B01D 39/20* (2006.01)
*C04B 35/14* (2006.01)
*C04B 35/626* (2006.01)
*C04B 38/04* (2006.01)
*C04B 38/06* (2006.01)
*E04B 1/74* (2006.01)

(52) U.S. Cl.
CPC ...... *C04B 35/6263* (2013.01); *C04B 35/6264* (2013.01); *C04B 38/04* (2013.01); *C04B 38/06* (2013.01); *C04B 2235/3217* (2013.01); *C04B 2235/3232* (2013.01); *C04B 2235/3239* (2013.01); *C04B 2235/3244* (2013.01); *C04B 2235/3251* (2013.01); *C04B 2235/3258* (2013.01); *C04B 2235/3418* (2013.01); *C04B 2235/44* (2013.01); *C04B 2235/441* (2013.01); *C04B 2235/443* (2013.01); *C04B 2235/444* (2013.01); *C04B 2235/483* (2013.01); *E04B 2001/742* (2013.01)

(56) References Cited

OTHER PUBLICATIONS

Tetraethyl orthosilicate. Sigma Aldrich. Accessed Nov. 13, 2014 on <http://www.sigmaaldrich.com/catalog/product/aldrich/333859?lang=en&region=US>.*
Tetradecyl trimethyl ammonium bromide. Alibaba. Accessed Nov. 13, 2014 on <http://www.alibaba.com/product-detail/tetradecyl-trimethyl-ammonium-bromide-1119-98_215548493.html>.*
Machine translation of Backov. FR 2852947. 7 pages. Oct. 1, 2004.*
Machine translation of Backov. FR 2912400. 10 pages. Aug. 15, 2008.*
International Search Report dated Jan. 19, 2012, PCT/FR2011/052359.
Chapter 6. Highly Concentrated Emulsions as Templates for Solid Foams, Esquena, J; Solans, C; Nov. 2005.
Synthesis of macroporous silica from solid-stabilised emulsion templates, Aranberri, I; Binks, B; Clint, J; Fletcher, P; May 31, 2008.

* cited by examiner 1 mm

PROCESS FOR PREPARING CELLULAR INORGANIC MONOLITHIC MATERIALS AND USES OF THESE MATERIALS

RELATED APPLICATIONS

This application is a National Phase Application of PCT/FR2011/052359, filed on Oct. 10, 2011, which in turn claims the benefit of priority from French Patent Application No. 10 58247 filed on Oct. 11, 2010, the entirety of which are incorporated herein by reference.

BACKGROUND

Field of the Invention

The present invention relates to a process for preparing macroporous inorganic monolithic materials with controlled macroporosity making it possible in particular to access silica monoliths having an open and controlled macroporosity with a uniform macropore size (monodispersity) ranging from a micron to a few hundred microns and optionally comprising additional porosity, and also to the use of these materials, especially for separative chemistry and filtration, for performing chemical reactions catalysed in heterogeneous phase, as thermal or phonic insulation materials, or alternatively as templates for the manufacture of carbon skeletons of controlled porosity.

DESCRIPTION OF RELATED ART

Materials that are in the form of macroporous monoliths with open porosity, as a function of their chemical nature, constitute materials of choice for numerous applications such as separative chemistry, for instance chromatography, filtration, adsorption, heterogeneous-phase catalysis, the manufacture of electrodes and energy storage, on account of their large specific surface area, their large pore volume and their excellent mechanical properties.

For the purposes of the present invention, an open porosity is porosity that is accessed from the exterior of the material and that participates in the transportation of matter. These materials comprise a high specific surface area and a hierarchic structure.

To date, a large number of synthetic macroporous materials exist, and various types of processes allow for the creation thereof.

B. P. Binks, Adv. Mater., 2002, 14(24), December 17, describes the preparation of porous silica from an emulsion stabilized only with silica particles, in the absence of surfactant, Evaporation in air produces solids with different degrees of porosity and inherent wettability. The materials obtained according to this process are, however, crumbly and lack cohesion (the cohesion comes solely from attraction between the particles). They are moreover free of mesoporosity.

(Gi-Ra Yi, et al., Chem. Mater., 1999, 11, 2322-2325, describe a process that uses sodium dodecyl sulfonate (SDS) as surfactant. A silica sol is prepared by mixing tetraethoxysilane (TEOS) or tetramethoxysilane (TMOS) and hydrochloric acid with stirring. Gelation is obtained by addition of ammonium hydroxide. The final product is obtained by calcination. The drawback of this process is that it leads to a porous material but in which the pores are not monodispersed.

More recently, a process for preparing macroporous inorganic monoliths was proposed, especially in patent application FR 2 852 947, which consists in preparing an emulsion by introducing an oily phase into an aqueous solution of surfactant, and then in adding an aqueous solution of at least one silicon oxide precursor to the surfactant solution, before or after the preparation of the emulsion, and in leaving the reaction mixture to stand until the said precursor has condensed, which leads, after drying, to the macroporous silica monolith. The monoliths obtained according to this process have a macroporosity ranging from 1 to 20 µm approximately. This process does not, however, make it possible to access macroporous silica monoliths in which the pore size can exceed 20 µm. Furthermore, this process also has the drawback of leading to a material in which the pores are not mnonodispersed.

Various authors have also proposed processes for preparing macroporous monoliths by solidification of a Pickering emulsion, i.e. an oil-in-water or water-in-oil emulsion in which the droplets of the dispersed phase are stabilized with colloidal solid particles adsorbed at the water/oil interface. Thus, Li Z. et al. (Angew. Chem. Int., 2009, 48, 8490-8493) describe the preparation of hexane-in-water emulsions stabilized by adsorption of microparticles of poly(N-isopropylamide)-co-(methacrylic acid) (PNIPAM-co-MMA) polymer gel at the oil/water interface and in which the PNIPAM-co-MMA present in excess in the emulsion forms a gel in the continuous phase of the emulsion. Evaporation in air of the continuous phase leads, without chemical reaction, to a porous material but in which the pores are not interconnected. More recently, Ikem V. O. et al. (Langmuir, 2010, 26(11) 8836-8841) have described the preparation of oil-in-water emulsions stabilized with functionalized titanium particles which lead, after polymerization of the emulsion, to highly macroporous polymers but whose pores are not interconnected either (closed porosity).

OBJECTS AND SUMMARY

It is thus noted that there is a lack of hierarchic porous inorganic materials that are in the form of macroporous monoliths in which the pore size is controlled and uniform and can range from about a micrometer to several hundred micrometers and in which the pores are interconnected.

The aim of the present invention is to provide a preparation process for accessing such materials.

One subject of the present invention is a process for preparing an inorganic material in the form of an alveolar monolith consisting of a silica matrix comprising interconnected macropores with a mean dimension $d_A$ of from 1 µm to 400 µm and micropores with a mean dimension $d_1$ of from 0.7 to 2 nm, the said process being characterized in that it comprises at least one step of mineralization of an oil-in-water emulsion formed from droplets of an oily phase dispersed in a continuous aqueous phase and in which colloidal solid particles are present at the interface formed between the continuous aqueous phase and the dispersed droplets of oily phase, and in that:
 the volume fraction of the oily phase is greater than 50%, and
 the said mineralization step is performed without stirring and at a pH of less than or equal to 3, in the presence of at least one silicon oxide precursor in an amount of greater than or equal to 3% by mass relative to the mass of the aqueous phase.

According to one preferred embodiment of the invention, the amount of colloidal solid particles in the emulsion ranges from 0.05 mg of particles/mL of oily phase to 16 g of particles/mL of oily phase, and even more preferentially from 3.5 mg/mL to 8 mg/mL of oily phase.

The use of this process makes it possible, surprisingly, to access silica monoliths comprising a macroporous network in which the pores are interconnected (open porosity) and have a calibrated and uniform size that may range between 1 and 400 μm. Specifically, it is possible, by virtue of the presence of the colloidal solid particles present at the interface of the oily phase and of the aqueous phase, to stabilize the emulsion and to allow homogeneous mineralization of the aqueous phase, leading simply and reproducibly to a silica monolith of open macroporosity in which the size of the macropores is a direct result of the volume fraction of the oily phase of the emulsion that was used for its preparation and of the size of the drops of the emulsion, which may be fixed simply by the amount of particles adsorbed at the oil/water interface (limited coalescence process). Furthermore, the presence of colloidal solid particles at the interface formed between the continuous aqueous phase and the droplets of oily phase in the proportions indicated above not only does not prevent the formation of a monolith with open porosity, but, in addition, gives access to a monolith with monodisperse macroporosity.

For the purposes of the present invention, the term "monolith" means a solid object with a mean dimension of at least 1 mm.

According to the invention, the micropores are present in the thickness of the walls of the macropores, thus making them microporous.

According to one particular and preferred embodiment of the process according to the invention, the process comprises, in this order, the following steps:

i) the preparation of an aqueous phase containing at least one silicon oxide precursor in an amount of greater than or equal to 3% by mass relative to the mass of the aqueous phase and at least one acid in a sufficient amount to bring the aqueous phase to a pH of less than or equal to 3;

ii) the addition to the said aqueous phase of the colloidal solid particles;

iii) the addition, to the said aqueous phase containing the colloidal particles, of the oily phase, with mechanical stirring until the said oil-in-water emulsion is obtained, and then iv) leaving the emulsion resulting from step iii) to stand until the said material is obtained in the form of a macroporous silica monolith.

According to this first variant, step i) brings about hydrolysis of the silicon oxide precursor, step ii) brings about the dispersion of the colloidal particles, step iii) leads to the formation of the oil-in-water emulsion in which the colloidal solid particles are adsorbed at the water/oil interface, whereas step iv) leads to mineralization of the emulsion, and thus to the production of the macroporous monolith, by condensation of the hydrolysed silicon oxide precursors.

According to another particular embodiment of the process in accordance with the invention, the oil-in-water emulsion is prepared in a single step by mixing, with mechanical stirring:

i) an aqueous phase containing at least one silicon oxide precursor in an amount of greater than or equal to 3% by mass relative to the mass of the aqueous phase, at least one acid in a sufficient amount to bring the aqueous phase to a pH of less than or equal to 3, and colloidal solid particles in an amount of greater than or equal to 3% by mass relative to the mass of the aqueous phase, and ii) an oily phase in an amount such that the volume fraction of the oily phase in the resulting emulsion is greater than 50%;

the said emulsion then being left to stand until the said material is obtained in the form of a macroporous silica monolith.

The oily phase of the emulsion preferably consists of one or more compounds chosen from linear or branched alkanes containing from 7 to 22 carbon atoms. Examples of such alkanes that may be mentioned include dodecane and hexadecane.

The amount of oily phase present in the emulsion may be adjusted as a function of the diameter of the macropores that it is desired to obtain for the silica monolith, it being understood that the higher the oil/water volume fraction, the smaller will be the diameter of the oil droplets in the emulsion and the smaller will also be the diameter of the macropores.

According to one preferred embodiment of the invention, the volume fraction of the oily phase of the emulsion ranges from 60% to 90% and even more preferentially from 64% to 82%. These amounts of oily phase make it possible to obtain a macroporous silica monolith in which the mean diameter of the macropores ranges from 1 to 400 μm approximately.

The colloidal solid particles may be mineral or organic. Preferably, they are mineral particles chosen from the group of metal oxides, hydroxides and sulfates. Among such oxides, mention may be made most particularly of silicon oxide, titanium oxide, zirconium oxide and iron oxide, and also salts thereof such as silicates (for example clays). Finally, mention may be made of carbon colloidal particles. Among the organic colloidal solid particles that may especially be mentioned are polymer particles, for example latex particles.

In order to be colloidal, the solid particles generally have a size of less than a few micrometers. Thus, the particles generally have a mean size of between 5 and 5000 nm inclusive and preferably between 5 and 500 nm inclusive.

The amount of particles (per fixed amount of oil) present in the emulsion may be adjusted as a function of the diameter of the macropores that it is desired to obtain for the silica monolith, it being understood that the larger the amount of particles, the smaller will be the diameter of the oil droplets in the emulsion and the smaller will also be the diameter of the macropores.

According to one particularly preferred embodiment of the invention, the colloidal solid particles are chosen from silicon oxide nanoparticles. Examples that may especially be mentioned include the products sold under the trade name AEROSIL® by the company Evonik Degussa.

Advantageously, the amount of colloidal solid particles present in the continuous aqueous phase varies as a function of the desired mean volumetric size of the droplets of the oily phase in the emulsion and consequently of the desired size for the macropores of the material. The mean diameter of the droplets of oily phase in the emulsion may range between 1 μm and 1 mm approximately and preferably between 10 and 200 μm approximately.

Moreover, the colloidal solid particles generally have a charged hydrophilic surface, which does not favour their adsorption at the surface of the droplets of the dispersed oily phase. Thus, and according to a particularly preferred embodiment of the invention, the colloidal solid particles are functionalized at the surface to make them more hydrophobic and thus to promote their adsorption at the interface formed between the continuous aqueous phase and the dispersed droplets of fatty phase.

The colloidal solid particles may thus be functionalized with compounds attached to their surface via covalent bonds. This may be performed by pretreating the particles, in particular by chemical grafting with a compound comprising hydrophobic groups such as an alkylsilane or a trialkoxysilane of formula R—Si—(OR')$_3$, in which R is a linear or branched C$_1$ to C$_{12}$ and in particular C$_2$ to C$_{10}$ alkyl, most particularly n-octyl, optionally bearing an amino group, and R', which may be identical to or different from R, is a linear or branched C$_1$ to C$_{12}$ and in particular C$_1$ to C$_6$ alkyl group, most particularly ethyl. The use of particles of this type leads to the production of a functionalized macroporous silica monolith (presence of groups R'). Examples of such particles that may especially be mentioned include the colloidal silica particles sold under the trade name AEROSIL® R816 by the company Evonik Degussa, with a mean diameter of about 12 nm and at the surface of which are attached hexadecylsilane groups.

The colloidal solid particles may also be functionalized by adsorption of surfactant molecules at their surface, which give them a certain amount of hydrophobicity, the hydrophilic end of the surfactant being adsorbed onto the surface of the particles. The surfactants that may be used to functionalize the particles are preferably cationic or anionic surfactants. Among these surfactants, the ones particularly preferred are cationic surfactants chosen especially from tetradecyltrimethylammonium bromide (TTAB), dodecyltrimethylammonium bromide and cetyltrimethylammonium bromide (CTAB). TTAB is particularly preferred.

As examples of particles functionalized with a surfactant, mention may be made especially of silica nanoparticles whose surface is functionalized with a quaternary ammonium, such as those sold under the name AEROSIL® A380 by the company Evonik Degussa, with a diameter of 7 nm, and whose surface is functionalized with tetradecyltrimethylammonium bromide (TTAB).

The functionalization of the colloidal solid particles with a surfactant may also be performed in situ, i.e. during their introduction into the continuous aqueous phase of the emulsion. In this case, the continuous aqueous phase of the emulsion also contains the said surfactant in an amount preferentially less than the critical micelle concentration (CMC), this surfactant then being adsorbed at the surface of the particles when they are in the aqueous phase of the emulsion. Preferably, the amount of surfactant ranges from 1/200 to 1/3 of the CMC.

As examples of colloidal solid nanoparticles functionalized in situ with a surfactant, mention may be made especially of silica nanoparticles whose surface is prefunctionalized with hexadecylsilane, such as those sold under the brand name AEROSIL® R816 by the company Evonik Degussa, with a mean diameter of about 12 nm, and whose surface may then optionally be further functionalized in situ by adsorption of a cationic surfactant, such as TTAB.

According to one particularly preferred embodiment of the invention, the ratio of the "number of surfactant molecules per unit surface area of particles", i.e. the mass ratio of the mass of surfactant (m$_{SA}$)/mass of colloidal particles (m$_p$), i.e. m$_{SA}$/m$_p$, ranges from 1 mg of surfactant per gram of particles to 0.8 g of surfactant per gram of particles and even more preferentially from 0.5 mg of surfactant per gram of particles to 0.1 g of surfactant per gram of particles.

The mechanical stirring performed during the second step may especially be performed in a device for emulsifying, for instance in devices sold under the trade name ULTRA-TURRAX® or Rayneri.

The silicon oxide precursor(s) are preferably chosen from tetramethoxy-ortho-silane (TMOS), tetraethoxy-ortho-silane (TEOS), dimethyldiethoxysilane (DMDES) and mixtures of DMDES with TEOS or TMOS.

According to one preferred embodiment of the invention, the silica precursor is TEOS.

The concentration of silicon oxide precursor(s) in the aqueous phase of the emulsion preferably ranges from 25% to 35% by mass relative to the mass of the aqueous phase.

Besides the silicon oxide precursor(s), the aqueous phase of the emulsion may also comprise one or more precursors of a metal oxide of formula MeO$_2$ in which Me is a metal chosen from Zr, Ti, Th, Nb, Ta, V, W and Al. These metal oxide precursors are preferably chosen from alkoxides, chlorides and nitrates of metals chosen from Zr, Ti, Th, Nb, Ta, V, W and Al. When a metal oxide precursor is used, the matrix of the monolith is a mixed matrix of SiO$_2$-MeO$_2$ type in which the MeO$_2$ content remains minor relative to the silicon oxide content, and preferentially the content of metal oxide precursor MeO$_2$ in the aqueous phase represents from 1% to 30% by mass relative to the mass of the silicon oxide precursors, and more particularly from 5% to 20% by mass relative to the mass of silicon oxide precursors.

According to one preferred embodiment of the invention, the mineralization step is performed at a pH of less than or equal to 1.

The mineralization step is advantageously performed at a temperature close to room temperature. The duration of this step may range from a few hours (2 to 3 hours) to a few weeks (2 to 3 weeks) as a function of the pH of the reaction medium.

The acid used to adjust the pH of the aqueous phase of the emulsion to the desired value is preferably chosen from hydrochloric acid (HCl), ortho-phosphoric acid (H$_3$PO$_4$), nitric acid (HNO$_3$), acetic acid (CH$_3$COOH) and formic acid (HCOOH).

The monolith obtained after the mineralization step is then preferably washed and dried.

Washing of the material makes it possible to remove the organic residues originating from the oily phase and found essentially in the macropores. This washing may be performed using a volatile organic solvent such as acetone, tetrahydrofuran (THF) or mixtures thereof.

According to one particular embodiment of the process of the invention, the material may also undergo a calcination step, performed, for example, at a temperature of from 180 to 700° C. and preferably from 600 to 700° C. In particular, when colloidal solid particles functionalized with hydrophobic groups such as a trialkoxysilane of formula R—Si—(OR')$_3$ as described previously, are used in the emulsion leading to the production of the monolith, it is preferable to perform the calcination of the monolith at a temperature of 180-200° C. approximately, so as not to calcinate the group R'.

The functionalization of the monoliths obtained according to the process in accordance with the invention may also be performed a posteriori, i.e. after the mineralization step. In this case, the process in accordance with the invention also comprises, preferably after the calcination step, a step of impregnating the monolith using a solution containing a functionalizing agent.

The material obtained in accordance with the process of the invention may be used for various industrial applications, for instance for separative chemistry and filtration, for performing chemical reactions catalysed in heterogeneous phase, as thermal or phonic insulation materials (in particular as high-frequency-selective acoustic insulator), or alternatively as templates for the manufacture of controlled-porosity carbon skeletons. In the latter case, the material in accordance with the invention serves simply as a template; it is impregnated with a solution of carbon precursors, and then carbonized so as to obtain, after dissolution of the material in accordance with the invention, a macroporous carbon monolith.

In the field of separative chemistry, it is in particular possible to use the materials obtained in accordance with the process of the invention for the preparation of macroporous chromatography columns in which the porosity is hierarchic and calibrated. In this case, the chromatography column may consist of several macroporous monoliths in accordance with the invention stacked on each other, the said monoliths comprising either identical porosities or different porosities resulting from the mineralization of emulsions comprising droplets of different sizes and concomitantly mineralized so as to create chromatography columns with a macroporosity gradient.

DETAILED DESCRIPTION

Figure 1:
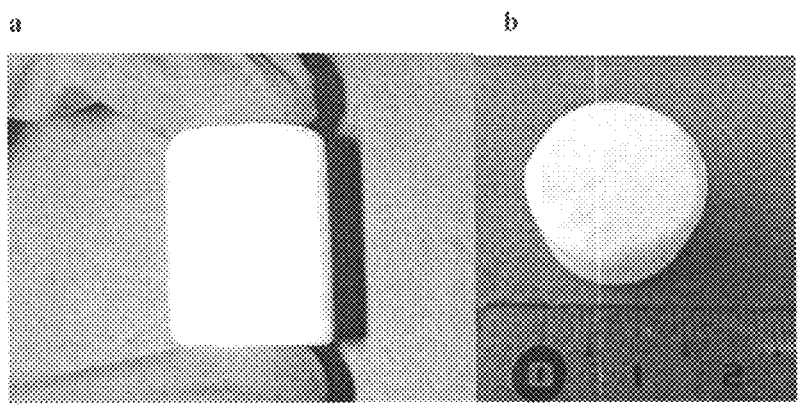
FIGS. 1(a) and 1(b) are photographs of monolith $M_{75}$ in side view (FIG. 1a) and in top view (FIG. 1b) from example 1, in accordance with one embodiment.

The present invention is illustrated by the following implementation examples, to which it is not, however, limited.

EXAMPLES

The starting materials used in the examples that follow are listed below:
  98% tetradecyltrimethylammonium bromide (TTAB): from Alfa Aesar;
  98% tetraethoxy-ortho-si lane (TEOS): from Aldrich;
  99% hexadecane (mass per unit volume: 0.773 g/cm$^2$): from Sigma-Aldrich;
  commercial acetone;
  tetrahydrofuran;
  37% hydrochloric acid of ISO quality for analyses: from Carlo Erba Reagent;
  silica nanoparticles functionalized with hexadecylsilane groups, sold under the trade name AEROSIL® R816 by the company Evonik Degussa (diameter: 12 nm, specific surface area: 190±20 m$^2$/g);
  demineralised water.

These starting materials were used as received from the manufacturers, without additional purification.

In the examples that follow, each of the emulsions prepared had a total volume of 20 mL.

In the text hereinbelow, $m_p$ indicates the amount in grams of silica nanoparticles used per 20 mL of emulsion and $\phi$ is the volume fraction of oil (hexadecane) in the emulsion.

The macroporosity was characterized qualitatively by an SEM technique using a TM-1000 microscope from the company Hitachi. The samples were coated with gold or carbon by plasma deposition before being characterized.

Example 1

Preparation of Macroporous Silica Monoliths from Emulsions of Varied $\phi$

In this example, various silica monoliths were prepared from water-in-oil emulsions having different volume fractions of oil.

The general protocol below was used:

i) The aqueous phase was prepared by mixing the water in an amount suited to the desired volume fraction of oil ($\phi$), the nanoparticles in an amount $m_p$, 0.29 g of HCl and 2.24 g of TEOS. This mixture was left to stand to the point of hydrolysis of the TEOS. The suspension was optionally sonicated using an ultrasonic bath in order better to disperse the particles. Hexadecane was added in an amount corresponding to $\phi$. The whole was stirred using a homogenizer of ULTRA-TURRAX® type (sold by the company Janke-Kunkel IKA Labortechnik) at a speed of 24 000 rpm for about 30 seconds.

ii) The solidification of the emulsions took place at rest for 10 days to allow polycondensation of the silica precursor (TEOS) in the continuous phase of the emulsion in the form of a silica monolith.

iii) The silica monoliths thus obtained were washed 3 times, at 24 hours per time, in baths consisting of an acetone/THF mixture (30/70 v/v) in order to remove the residual oil present in the macropores of the monolith, and dried in a desiccator at room temperature for 7 days.

iv) The monoliths were then calcined in a tubular oven (of the brand Nabertherm, manufacturer code LT311P330) in air and according to the following temperature programme: temperature rise up to 200° C. at a rate of 2° C./min, steady stage at 200° C. for 2 hours, rise to 650° C. at a rate of 2° C./min, steady stage at 650° C. for 6 hours, stoppage of the oven and return to room temperature via the oven inertia. This calcination step makes it possible to remove the remaining traces of organic matter (oil, solvents, etc.) but also to densify the material by sintering the silica.

Table I below gives the characteristics of the monoliths manufactured according to this protocol:

TABLE I

| Monolith | $m_p$ (in g) | $\phi$ (in %) | Size of the macropores (in µm) |
|---|---|---|---|
| $M_{64}$ | 0.050 | 64 | 144 |
| $M_{70}$ | 0.055 | 70 | 208 |
| $M_{75}$ | 0.059 | 75 | 136 |
| $M_{80}$ | 0.062 | 80 | 154 |
| $M_{85}$ | 0.066 | 85 | 178 |
| $M_{87}$ | 0.068 | 87 | 143 |

The monoliths $M_{64}$; $M_{75}$; $M_{80}$ and $M_{85}$ were examined by scanning electron microscopy (SEM) using a microscope sold under the reference TM-1000 by the company Hitachi, before and after the calcination step.

Figure 2:
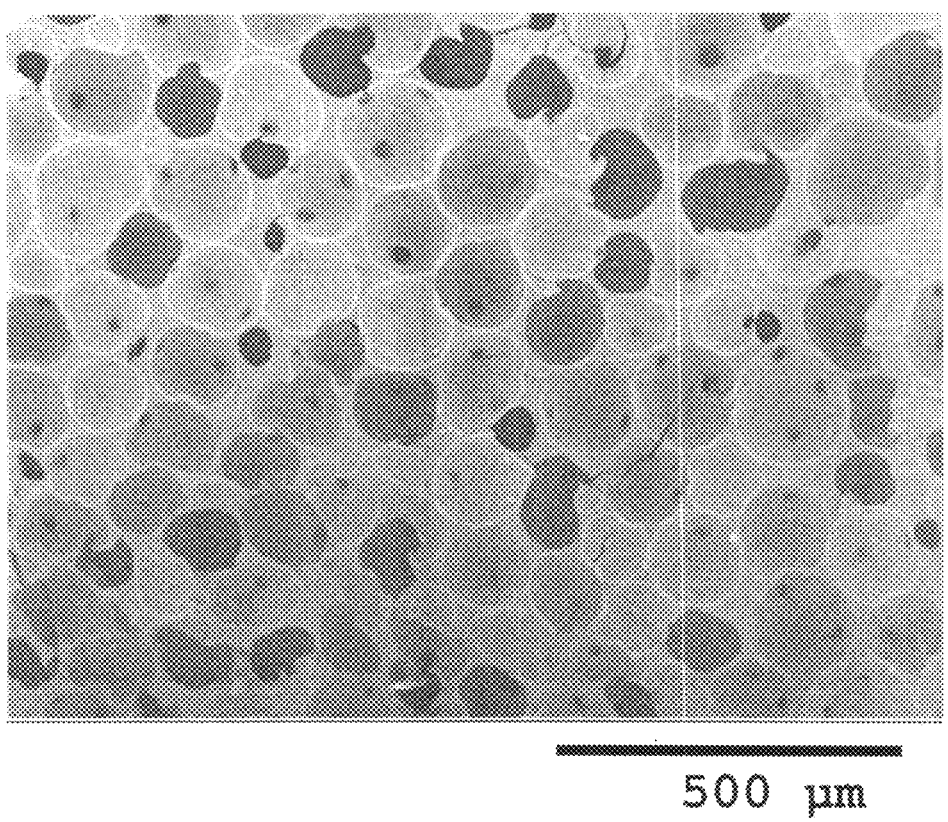
FIG. 2 is an SEM photograph of monolith $M_{64}$ before calcination from example 1, in accordance with one embodiment.

The attached FIG. 2 is the SEMI photograph of monolith $M_{64}$ before calcination.

Figure 3:
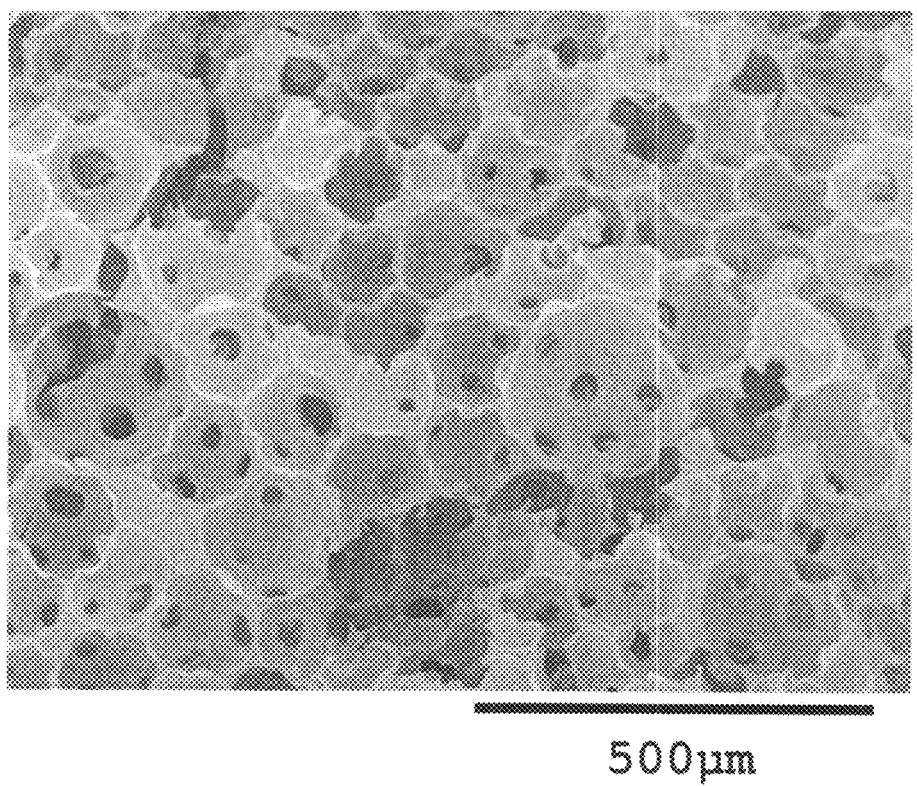
FIG. 3 is an SEM photograph of monolith $M_{75}$ before calcination from example 1, in accordance with one embodiment.

The attached FIG. 3 is the SEM photograph of monolith $M_{75}$ before calcination.

Figure 4:
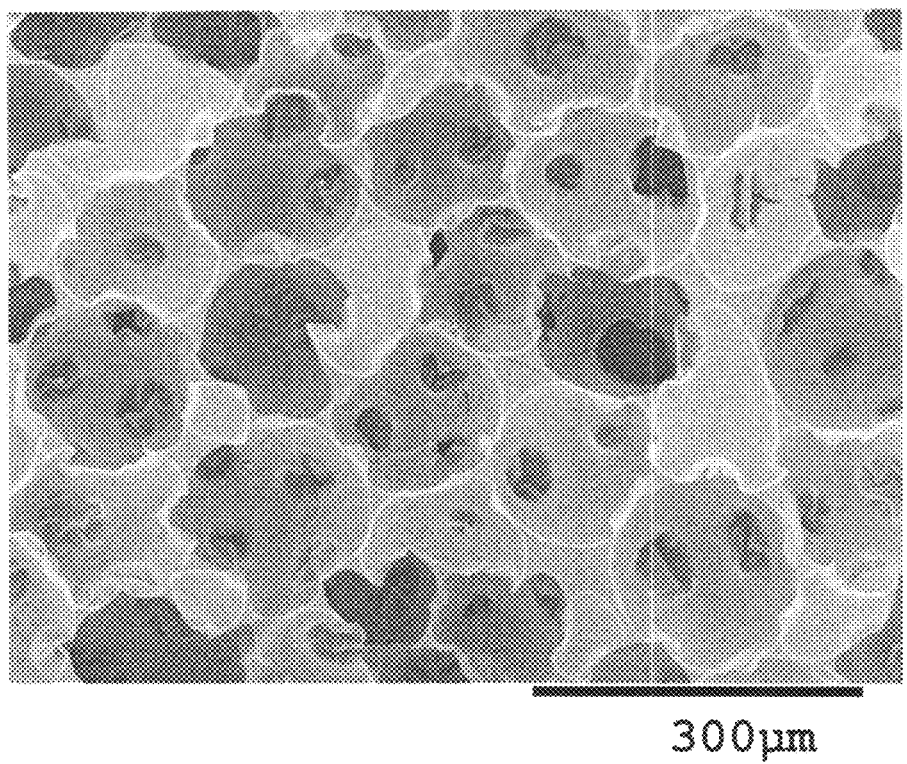
FIG. 4 is an SEM photograph of monolith $M_{80}$ before calcinations from example 1, in accordance with one embodiment.

The attached FIG. 4 is the SEM photograph of monolith $M_{80}$ before calcination.

Figure 5:
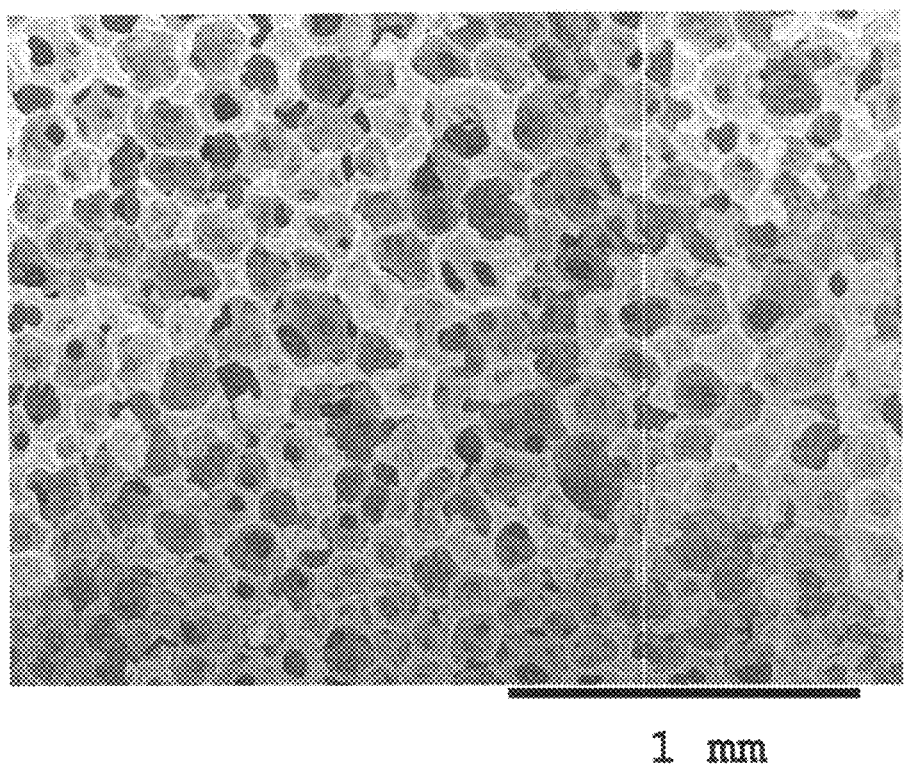
FIG. 5 is an SEM photograph of monolith $M_{64}$ before calcinations from example 1, in accordance with one embodiment.

The attached FIG. 5 is the SEM photograph of monolith $M_{85}$ before calcination.

Figure 6:
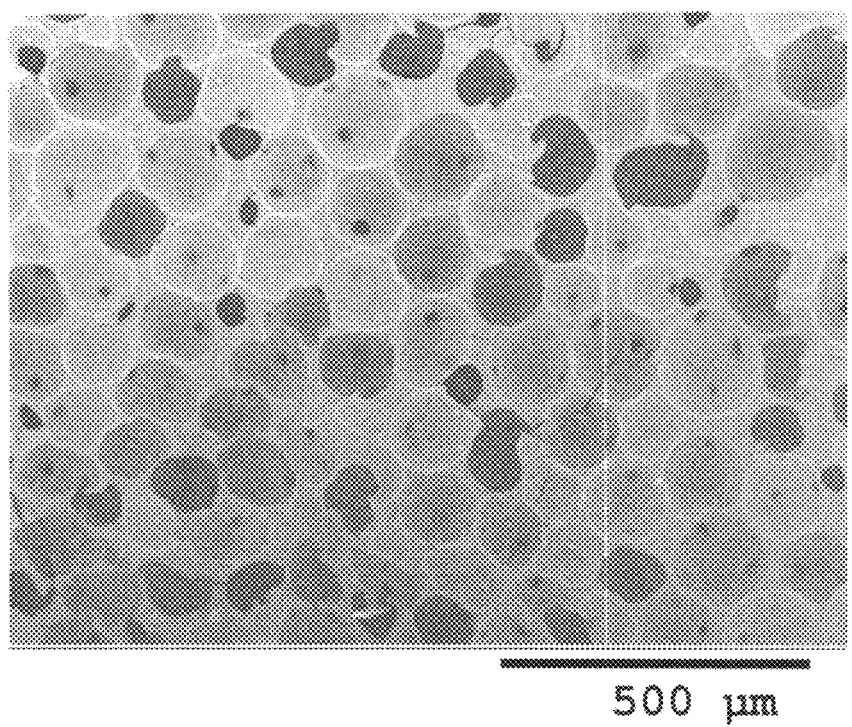
FIG. 6 is an SEM photograph of monolith $M_{64}$ after calcinations from example 1, in accordance with one embodiment.

The attached FIG. 6 is the SEM photograph of monolith $M_{64}$ after calcination.

Figure 7:
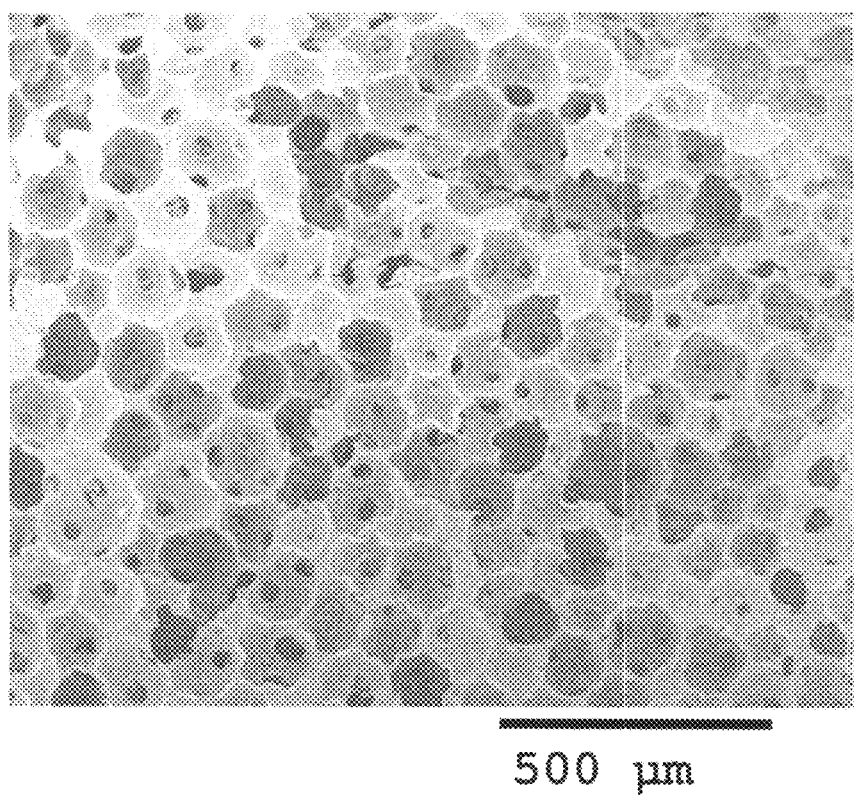
FIG. 7 is an SEM photograph of monolith $M_{75}$ after calcinations from example 1, in accordance with one embodiment.

The attached FIG. 7 is the SEM photograph of monolith $M_{75}$ after calcination.

Figure 8:
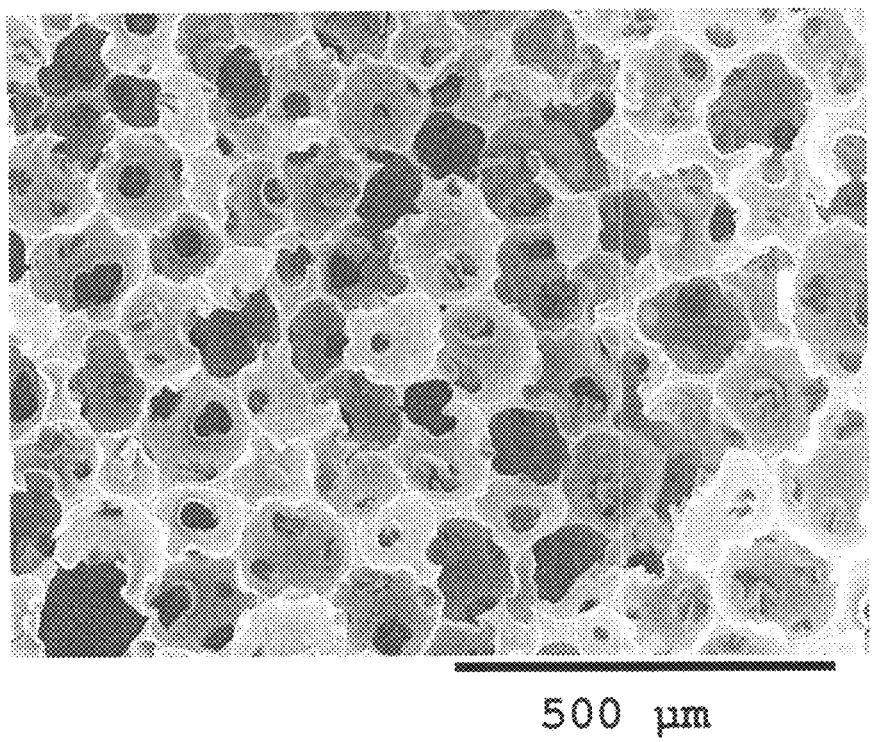
FIG. 8 is an SEM photograph of monolith $M_{80}$ after calcinations from example 1, in accordance with one embodiment.

The attached FIG. 8 is the SEM photograph of monolith $M_{80}$ after calcination.

Figure 9:
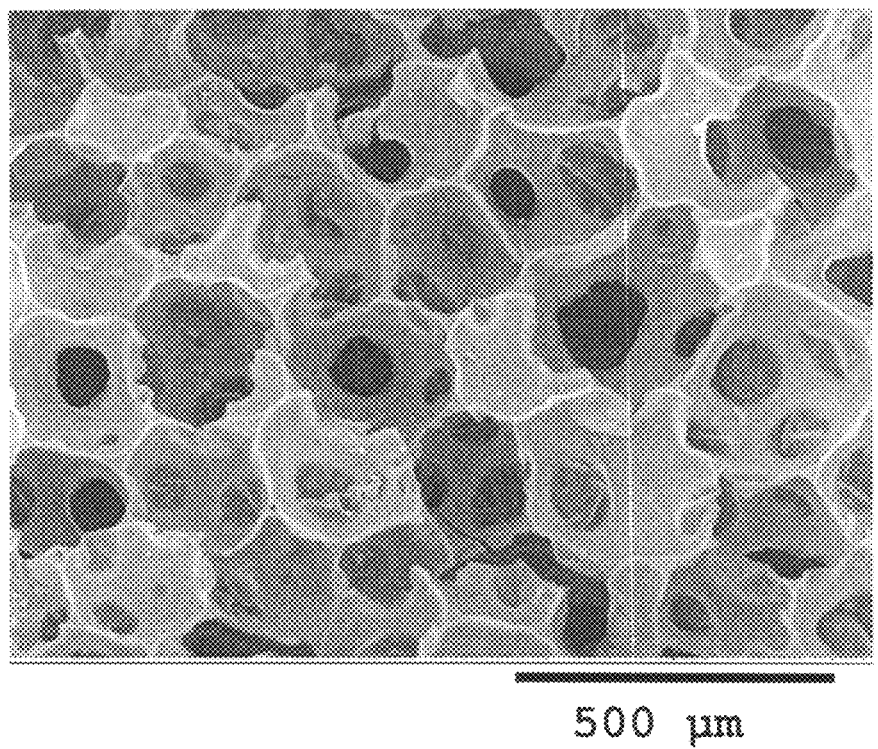
FIG. 9 is an SEM photograph of monolith $M_{85}$ after calcinations from example 1, in accordance with one embodiment.

The attached FIG. 9 is the SEM photograph of monolith $M_{85}$ after calcination.

These results show that the macropore volume increases with the volume fraction of the oily phase.

Example 2

Preparation of Macroporous Silica Monoliths with Varied Pore Sizes Starting with Emulsions Containing Colloidal Particles Functionalized with a Surfactant In this example, a cationic surfactant, TTAB, was used to functionalize the AEROSIL R816 particles used above in Example 1. The amount of particles was varied to vary the size of the pores while keeping the ratio $m_{SA}/m_p$ constant and equal to 0.0107. In this example, □ was kept constant and equal to 64%, i.e. the oily phase is composed of a fixed amount of 12.8 ml of hexadecane.

The composition of the aqueous phase was as follows: 2.85 g of HCl, 2.24 g of TEOS, $m_p$ grams of particles, $m_{SA}$=0.0107×$m_p$ grams of TTAB and a sufficient amount of water for 7.2 ml.

Besides these differences, the protocol for preparing the monoliths is identical to that used and described above in Example 1.

Table II below gives the characteristics of each of the monoliths thus prepared:

TABLE II

| Monolith | $m_p$ (in g) | Size of the macropores (in µm) |
|---|---|---|
| $M_{0.025}$ | 0.025 | 167 |
| $M_{0.050}$ | 0.050 | 87 |
| $M_{0.075}$ | 0.075 | 56 |
| $M_{0.10}$ | 0.10 | 43 |
| $M_{0.15}$ | 0.15 | 24 |
| $M_{0.20}$ | 0.20 | 17 |

After calcination, the monoliths $M_{0.025}$ and $M_{0.075}$ were examined by scanning electron microscopy (SEM) using a microscope sold under the reference TM-1000 by the company Hitachi.

Figure 10:
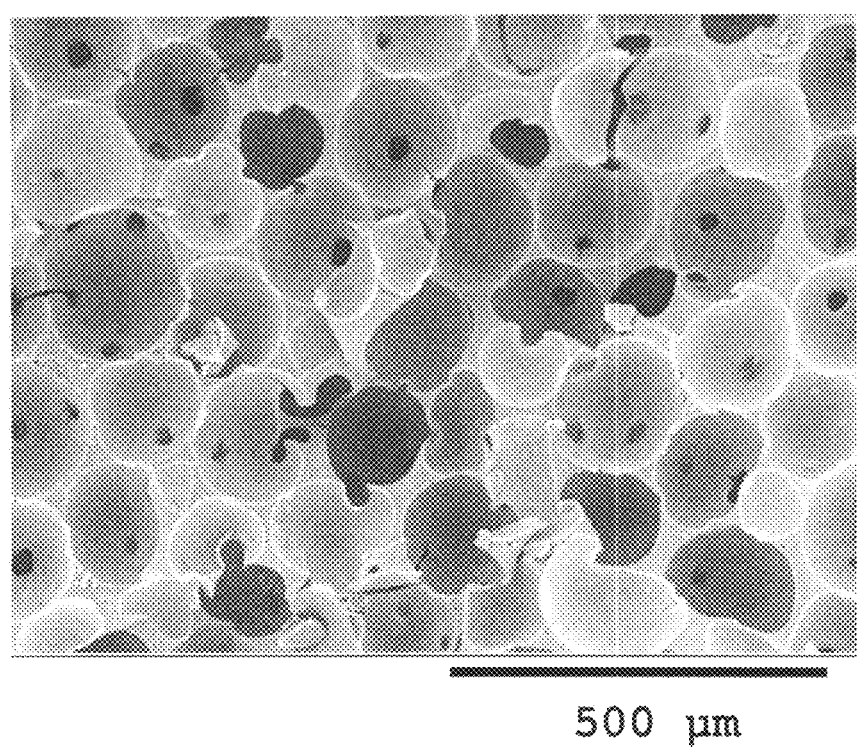
FIGS. 10 and 11 are, respectively, SEM photographs of monoliths $M_{0.025}$ and $M_{0.075}$ after calcinations from example 2, in accordance with one embodiment.
Figure 11:
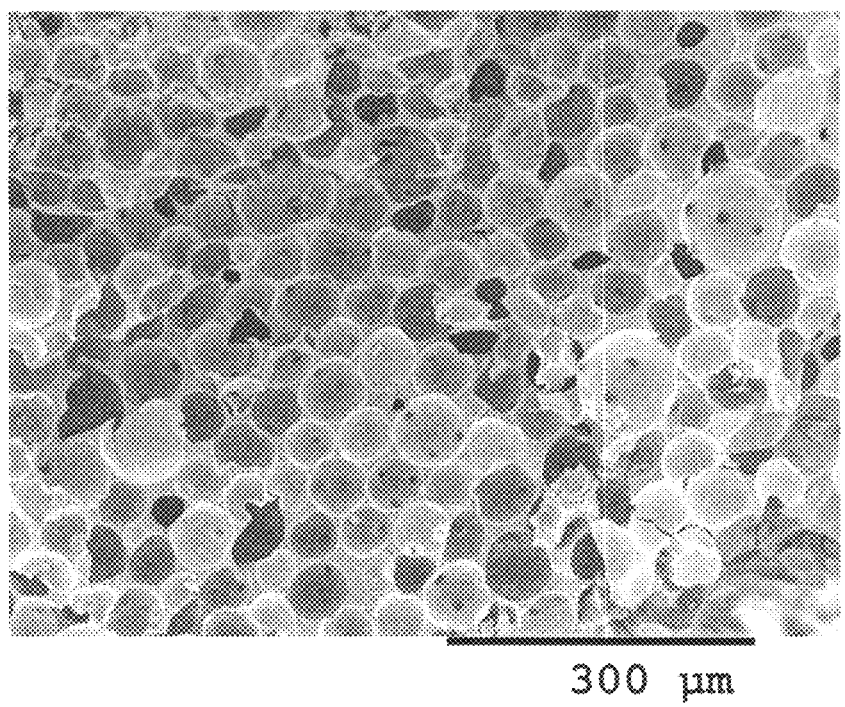

The attached FIGS. 10 and 11 are, respectively, the SEM photographs of monoliths $M_{0.025}$ and $M_{0.075}$ after calcination.

Figure 12:
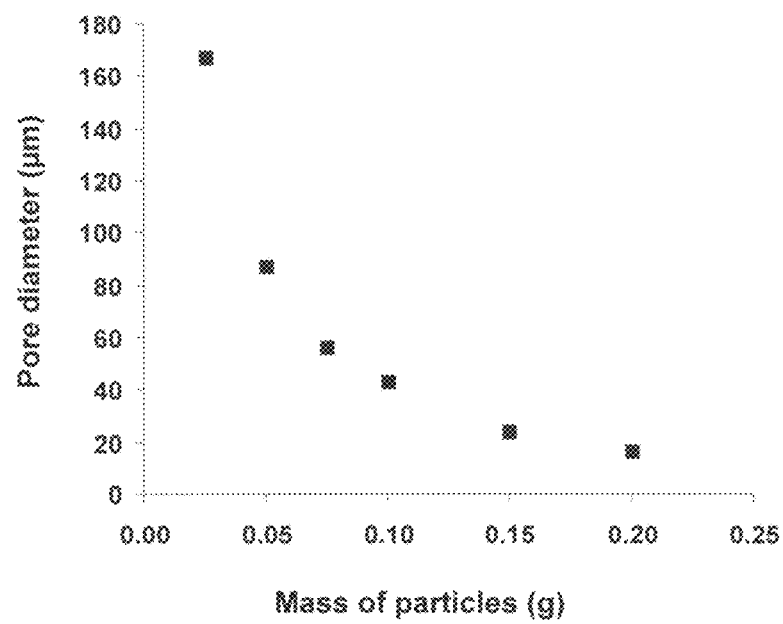
FIG. 12 is a chart showing the change in pore diameter (in µm) as a function of the mass of particles (in g) from example 2, in accordance with one embodiment.

Finally, the attached FIG. 12 shows the change in pore diameter (in µm) as a function of the mass of particles (in g).

Using surfactant to functionalize the particles allows better adsorption of these particles to the oil/water interface and good control of the size, as may be seen in FIG. 12.

The invention claimed is:

1. Process for preparing an inorganic material in the form of an alveolar monolith of a silica matrix having interconnected and monodispersed macropores, said process being capable of producing monodispersed macropores with a mean dimension $d_A$ ranging from 1 µm to 400 µm and micropores with a mean dimension $d_I$ of from 0.7 to 2 nm, said process comprising:

at least one step of mineralization of an oil-in-water emulsion formed from droplets of an oily phase dispersed in a continuous aqueous phase and in which colloidal solid particles are present at an interface formed between the continuous aqueous phase and the dispersed droplets of said oily phase, wherein a volume fraction of the oily phase is greater than 50%, wherein the said mineralization step is performed without stirring and at a pH less than or equal to 3, in the presence of at least one hydrolized silicon oxide precursor in an amount greater than or equal to 3% by mass relative to the mass of the continuous aqueous phase, and wherein said colloidal solid particles are silicon oxide nanoparticles, said colloidal solid particles being functionalized at their surface to make them hydrophobic, wherein said colloidal solid particles are adsorbed at said interface and said colloidal solid particles stabilize said oil-in-water emulsion, wherein a mass of the colloidal solid particles in the oil-in-water emulsion ranges from 0.05 mg of particles/mL of the oily phase to 16 g of particles/mL of the oily phase, and wherein when a surfactant is present in addition to said colloidal solid particles, the amount of said surfactant being of a mass ratio of a mass of said surfactant/mass of said colloidal solid particles ranges from 1 mg of said surfactant per gram of said colloidal solid particles to 0.8 g of said surfactant per gram of said colloidal solid particles.

2. Process according to claim 1, wherein the oily phase of the oil-in-water emulsion includes one or more compounds chosen from either one of linear or branched alkanes, containing from 7 to 22 carbon atoms.

3. Process according to claim 2, wherein said either one of linear or branched alkanes are chosen from either one of dodecane and hexadecane.

4. Process according to claim 1, wherein the volume fraction of the oily phase of the oil-in-water emulsion ranges from 60% to 90%.

5. Process according to claim 1, wherein in said oil-in water emulsion, the amount of the colloidal solid particles ranges from 0.05 mg of particles/mL of the oily phase to 8 mg of particles/mL of the oily phase.

6. Process according to claim 1, wherein the colloidal solid particles are functionalized with compounds attached to their surface via covalent bonds, the said compounds comprising hydrophobic groups.

7. Process according to claim 1, wherein said at least one silicon oxide precursors are selected from the group consisting of tetramethoxy-ortho-silane, tetraethoxy-ortho-silane, dimethyldiethoxysilane and mixtures of dimethyldiethoxysilane with tetraethoxy-ortho-silane and tetramethoxy-ortho-silane.

8. Process according to claim 1, wherein a concentration of said at least one hydrolized silicon precursor in said continuous aqueous phase of said oil-in water emulsion ranges from 25% to 35% by mass relative to a mass of the continuous aqueous phase.

9. Process according to claim 1, wherein the continuous aqueous phase of said oil-in water emulsion also comprises one or more precursors of a metal oxide of formula $MeO_2$ in which Me is a metal is selected from the group consisting of Zr, Ti, Th, Nb, Ta, V, W, and Al in an amount ranging from 1% to 30% by mass relative to a mass of said at least one hydrolized silicon precursors.

10. Process according to claim 9, wherein said one or more metal oxide precursors are chosen from alkoxides, chlorides, and nitrates of metals selected from the group consisting of Zr, Ti, Th, Nb, Ta, V, W, and Al.

11. Process according to claim 1, wherein the mineralization step is performed at a pH of less than or equal to 1.

12. Process according to claim 1, wherein said process also comprises a step of impregnating said alveolar monolith using a solution containing a functionalizing agent.

13. A process according to claim 1, said process further comprising a step of employing an inorganic material obtained according to claim 1 for separative chemistry and filtration, for performing chemical reactions catalysed in heterogeneous phase, as material for thermal or phonic insulation, or as templates for manufacturing controlled-porosity carbon skeletons.

14. Process according to claim 13, further comprising the step of employing said inorganic material as high-frequency-selective acoustic insulator.

15. Process according to claim 13, further comprising a step of employing said inorganic material for the preparation of chromatography columns with a macropore size gradient, wherein a chromatography column includes several macroporous alveolar monoliths stacked on each other, said macroporous alveolar monoliths comprising different macropore sizes resulting from the mineralization of oil-in-water emulsions comprising droplets of different sizes and mineralized to create a chromatography column with a macropore size gradient.

16. Process according to claim 1, wherein the dispersed droplets of oily phase in the oil-in-water emulsion have a mean diameter ranging between 1 µm and 1 mm.

17. Process for preparing an inorganic material in the form of an alveolar monolith of a silica matrix having interconnected and monodispersed macropores, said process being capable of producing monodispersed macropores with a mean dimension $d_A$ ranging from 1 µm to 400 µm and micropores with a mean dimension $d_I$ of from 0.7 to 2 nm, said process comprising:

at least one step of mineralization of an oil-in-water emulsion formed from droplets of an oily phase dispersed in a continuous aqueous phase and in which colloidal solid particles are present at an interface formed between the continuous aqueous phase and the dispersed droplets of said oily phase,
  wherein a volume fraction of the oily phase is greater than 50%, and wherein the said mineralization step is performed at a pH less than or equal to 3, in the presence of at least one silicon oxide precursor in an amount greater than or equal to 3% by mass relative to the mass of the continuous aqueous phase, and wherein said colloidal solid particles are silicon oxide nanoparticles, said colloidal solid particles being functionalized at their surface to make them hydrophobic,
  wherein said colloidal solid particles are adsorbed at said interface and said colloidal solid particles stabilize said oil-in-water emulsion,
  wherein a mass of the colloidal solid particles in the oil-in-water emulsion ranges from 0.05 mg of particles/mL of the oily phase to 16 g of particles/mL of the oily phase, and
  wherein the oil-in-water emulsion is prepared in a single step by mixing:
  i) said continuous aqueous phase containing at least one silicon oxide precursor in an amount of greater than or equal to 3% by mass relative to the mass of the aqueous phase, at least one acid in a sufficient amount to bring the continuous aqueous phase to a pH of less than or equal to 3, and the colloidal solid particles in an amount of greater than or equal to 3% by mass relative to the mass of the aqueous phase, and mechanically stirring it with
  ii) said oily phase in an amount such that the volume fraction of the oily phase in the resulting oil-in-water emulsion is greater than 50%; the said oil-in-water emulsion then being left to stand until the said inorganic material is obtained in the form of a silica monolith with monodispersed macroporosity.

18. Process for preparing an inorganic material in the form of an alveolar monolith of a silica matrix having interconnected and monodispersed macropores, said process being capable of producing monodispersed macropores with a mean dimension $d_A$ ranging from 1 µm to 400 µm and micropores with a mean dimension $d_I$ of from 0.7 to 2 nm, said process comprising:

at least one step of mineralization of an oil-in-water emulsion formed from droplets of an oily phase dispersed in a continuous aqueous phase and in which colloidal solid particles are present at an interface formed between the continuous aqueous phase and the dispersed droplets of said oily phase,
  wherein a volume fraction of the oily phase is greater than 50%, and
  wherein the said mineralization step is performed without stirring and at a pH less than or equal to 3, in the presence of at least one silicon oxide precursor in an amount greater than or equal to 3% by mass relative to the mass of the continuous aqueous phase, and
  wherein said colloidal solid particles are silicon oxide nanoparticles, said colloidal solid particles being functionalized at their surface to make them hydrophobic, wherein said colloidal solid particles are adsorbed at said interface and said colloidal solid particles stabilize said oil-in-water emulsion, wherein a mass of the colloidal solid particles in the oil-in-water emulsion ranges from 0.05 mg of particles/mL of the oily phase to 16 g of particles/mL of the oily phase, and wherein said process does not include a surfactant so as to stabilize the oil-in-water emulsion.

* * * * *

UNITED STATES PATENT AND TRADEMARK OFFICE
CERTIFICATE OF CORRECTION

PATENT NO. : 10,125,021 B2
APPLICATION NO. : 13/816771
DATED : November 13, 2018
INVENTOR(S) : Veronique Schmitt et al.

It is certified that error appears in the above-identified patent and that said Letters Patent is hereby corrected as shown below:

In the Claims

Column 11, Claim 8, Line 20: Between the words "silicon" and "precursor" the word "oxide" should be present.

Column 11, Claim 9, Line 30: Between the words "silicon" and "precursors" the word "oxide" should be present.

Signed and Sealed this
Fifth Day of March, 2019

Andrei Iancu
*Director of the United States Patent and Trademark Office*